Oct. 5, 1937.   J. D. CRAWFORD   2,094,872
COMBINED HOSE REEL AND VALVE
Filed April 15, 1936

INVENTOR.
BY John D Crawford
ATTORNEYS.

Patented Oct. 5, 1937

2,094,872

UNITED STATES PATENT OFFICE 2,094,872

COMBINED HOSE REEL AND VALVE

John D. Crawford, Los Angeles, Calif.

Application April 15, 1936, Serial No. 74,502

5 Claims. (Cl. 299—78)

My invention relates to valves and reels for water hose and the like, particularly for use with emergency fire equipment.

The primary object in my invention is to provide a combined hose reel and valve, whereby said reel and valve may be rotated within a casing to allow said valve, reel and casing to move in a manner to allow a hose to be coiled or uncoiled about a drum within said casing.

Another object is to provide a valve and reel casing concentrically disposed in relation to a valve and reel whereby a hose may be drawn through said casing to reel or unreel said hose while said hose is attached to a valve.

Another object in my invention is to store and protect a hose from the effect of light upon rubber or latex impregnated in the fabric of said hose and prevent deterioration of the material due to kinking or folding of the hose.

A still further object in my invention is to provide convenient means for reeling and unreeling hose about a drum without detaching said hose from the valve to which it may remain attached at all times.

Other and further objects in my invention will appear as the disclosure in the specification proceeds, as illustrated by the drawing, of which:

Like letters and figures indicate like parts throughout the drawing.

Figure 1:
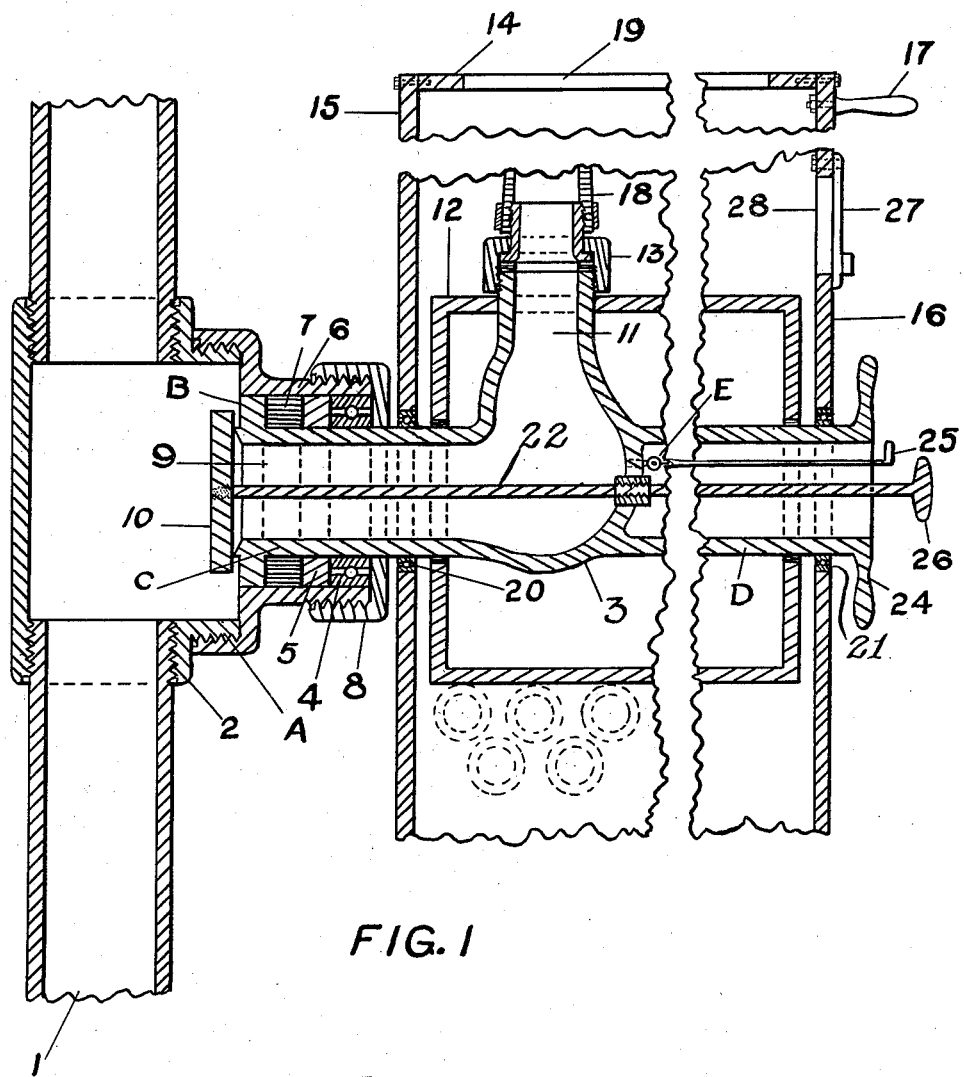
Fig. 1 shows a water supply pipe and a swivel valve and reel in longitudinal section.

The drawing is for the purpose of illustration only, and I do not confine myself to the exact structure shown, which may be changed within the scope of what is claimed.

Figure 2:
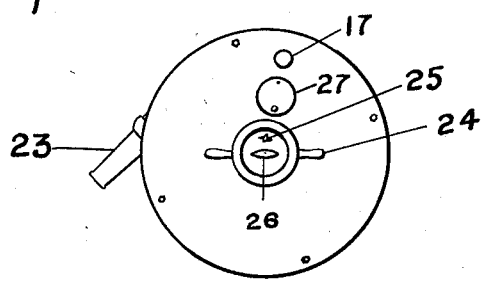
Fig. 2 is a plan view of my combined hose reel and valve.

1 is a liquid supply line threaded into a coupling member or flange 2, upon which is threadedly mounted at A a rotatable valve body 3, the valve body 3 having a coupling collar 6 adapted to receive a bearing 4 and a friction washer 5 being disposed against said bearing 4, a rubber packing ring adjacent to said friction washer 5, an external flange B being a part of shank C of valve body 3, said valve body 3 having an inlet opening 9, there being a valve member 10 seating across said valve opening 9, the valve body 3 having an outlet portion 11 extending through the wall of a cylindrical reel 12. A threaded coupling connection 13 is attached to the outlet portion 11; an annular wall forming a cylinder 14, having assembled therewith plates 15 and 16 bolted to the ends of said cylinder 14. A handle 17 is attached near the periphery of plate 16, the hose 18 is attached by coupling 13 to outlet 11, said hose 18 being disposed through an opening 19 in casing or cylinder 14. A ball bearing 20 is disposed to carry plate 15 around shank C of valve body 3. Plate 16 is journaled around tubular shank D upon bearing 21. A valve stem 22 extends through the valve body 3 and the tubular shanks C and D, also the valve wall E of said valve body 3, said stem 22 being attached to valve member 10. The hose 18 is shown in dotted lines coiled around reel 12 between the plates 15 and 16. In Fig. 2 nozzle 23 is shown protruding through the hole 19 in the wall of cylindrical casing 14. The entire foregoing assembly is held in assembled relationship and suspended by retaining cap 8 which is threaded to the coupling collar 6.

My device is mounted swiveled with supply line 1, the valve body 3 being journaled to rotate freely in bearing 4. The packing nut 7 is expanded and compressed by internal water pressure exerted by liquid pressure in the pipe line 1 whereby leakage of fluid is prevented through the bearing 4. The reel or drum 12 being attached integral with the valve body 3, allows the drum 12 and the valve body 3 to rotate freely at all times. The casing formed by the cylinder 14 and plates 15 and 16 being journaled on bearings 20 and 21 permits the casing to revolve in a manner to compensate for the difference in the movement of the drum 12 and the cylinder 14, which stays in a fixed position while the hose 18 is being unreeled.

It will be noted that since the cylinder 14 is freely mounted for rotation upon the shanks C and D of the valve body 3, it is necessary to hold said valve body in a stationary position by the handle 24 provided for the purpose. When the casing 14 is rotated by means of handle 17, the hose 18 is coiled around drum 12, the hole 19 in casing 14 acting as a guide.

A petcock located at E having a handle 25 is provided inside of shank D of the valve body 3, whereby air is allowed to enter said valve body 3 to drain the hose 18 after being used.

In an emergency the operator may grasp the nozzle 23 and pull the hose from around the reel or drum 12 through the opening 19 in casing 14, which then stands still, in such a manner as to unreel hose 18 from drum 12. The valve handle 26 may then be rotated to unseat valve member 10 to allow water to pass through the valve body 3 and the outlet 11 to hose 18. Thus it will be seen that the hose may be unreeled and utilized quickly in case of emergency without the necessity of coupling the hose to a valve or hydrant.

A pivoted cover 27 is provided across a hand hole or opening 28, so that the hose 18 may be coupled or uncoupled. This opening also facilitates the handling of the hose 18 when necessary, as the hose is passed through opening 19.

When the hose 18 is being rewound around the reel 12 by the movement of casing 14, as the casing is rotated, the hose is passed over the end of the casing as at 15, so that the hose may be moved with the rotation of casing 14 to prevent the hose from winding about the annular wall of said casing 14.

Since the air is allowed to enter petcock 25, the opening 19 in the casing 14 presses against the hose 18 when being rewound, tending to force the water out of the hose, the vacuum in the hose is released by the air entering through said petcock 25.

Having described my invention, and that which is new, I claim:

1. In combination a hose reel and valve comprising a valve body having oppositely disposed tubular shanks to form an axle, an inlet port and an outlet port in said valve body, one of said shanks forming an inlet for the valve body and having a swiveled attachment to a liquid supply line, an outlet for the valve body, said oppositely disposed shanks having a concentrically disposed drum or reel integral with said axle, a hose coupling attachment on the outlet of said valve disposed through the wall of said reel, a cylindrical housing journaled upon said axle and adapted to rotate upon said axle of said valve, whereby said cylindrical housing is capable of independent rotational movement in relation to said valve and reel.

2. For attachment to a fluid supply line, a device of the class described, including in combination a suitable pipe fitting having a coupling collar disposed thereon, a packing washer, a friction washer and bearing surrounding a shank of a valve body disposed within said coupling collar, a flange on said shank, said valve body being integral with a hose reel, said valve body forming an axis, a housing mounted to rotate on an axis formed by said shank and an oppositely disposed shank on said valve body, said housing having bearings disposed on the oppositely disposed shanks whereby said housing and axis are held in concentric alignment permitting said housing and reel to be rotated independently of one another and moved or held manually in various relationships to one another, including adjustable means to suspend the foregoing assembly in operative position, said suspending means being adjustable to pack the valve shank disposed in said coupling collar and prevent leakage of fluid from the supply line around said flange and shank.

3. A device as of claim 2, wherein the valve body having oppositely disposed hollow shanks is characterized by one shank serving as an inlet port, the opposite shank having a valve stem disposed therethrough, said valve stem extending through said valve body and said inlet port and attached to a valve member disposed across said inlet port, an air vent in said valve body, a stem to operate said air vent being disposed in the hollow shank opposite to said inlet port, comprising means whereby said valve inlet and said air vent may be conveniently operated to close said valve and allow air to enter said valve when liquid is used in said valve in order to facilitate the drainage of liquid from said valve and said hose.

4. A device as of claim 2, including an outer housing having a slot therein disposed transversely in relation to the circumferential wall of said housing to permit of winding a hose back and forth across the drum of the reel of said device.

5. The combination of a hose reel and valve comprising a valve body having an inlet and an outlet, tubular shanks extending from said valve body, one of said tubular shanks constituting the inlet and being provided with a flange thereon, a packing washer against said flange, a friction washer against said packing washer, an annular bearing unit against said friction washer, said tubular shank, flange, packing washer, friction washer and annular bearing unit held in operative position within a collar and bearing by sole means of an adjustable retaining nut, said shanks extending transversely to said outlet, a cylinder forming a reel, the wall of said reel being concentric to and integral with said tubular shanks, said outlet extending through the wall of said reel and adapted to take a hose coupling to attach a hose to said valve and reel, said reel and valve constructed and arranged so as to be capable of rotation within said collar and bearing, said collar being integral with a coupling member attached to a water supply line, a cylindrical housing surrounding said valve and reel, said cylindrical housing adapted to rotate about the axis formed by said tubular shanks of said valve, whereby rotation of said valve and reel may be independent of the housing.

JOHN D. CRAWFORD.